(12) United States Patent
Tilg et al.

(10) Patent No.: US 8,127,641 B2
(45) Date of Patent: Mar. 6, 2012

(54) DEVICE TO ADJUST THE ORIENTATION OF A MIRROR OF A MOTORCAR

(75) Inventors: Juergen Tilg, Kirchheim/Teck (DE); Daniel Joseph Flynn, Morphett Vale S.A. (AU)

(73) Assignee: SMR Patents S.a.r.l., Luxembourg (LU)

(*) Notice: Subject to any disclaimer, the term of this patent is extended or adjusted under 35 U.S.C. 154(b) by 822 days.

(21) Appl. No.: 12/171,862

(22) Filed: Jul. 11, 2008

(65) Prior Publication Data

US 2009/0021034 A1 Jan. 22, 2009

(30) Foreign Application Priority Data

Jul. 19, 2007 (EP) .................................... 07014141

(51) Int. Cl.
  *F16H 48/12* (2006.01)
  *G02B 7/182* (2006.01)
(52) U.S. Cl. ........... 74/650; 359/874; 359/876; 359/877
(58) Field of Classification Search .......... 359/872–874, 359/876, 877; 74/650
  See application file for complete search history.

(56) References Cited

U.S. PATENT DOCUMENTS

| | | | |
|---|---|---|---|
| 5,331,471 A * | 7/1994 | Gilbert | 359/874 |
| 5,481,931 A | 1/1996 | Vecchiarino | |
| 5,701,211 A | 12/1997 | Perry et al. | |
| 6,889,578 B2 * | 5/2005 | Spaziani et al. | 74/661 |
| 7,258,455 B2 * | 8/2007 | Weimer et al. | 359/606 |
| 7,392,567 B2 * | 7/2008 | Brouwer | 16/235 |
| 7,445,190 B2 * | 11/2008 | Brouwer | 248/466 |
| 7,541,706 B2 * | 6/2009 | Olijnyk et al. | 310/71 |
| 2005/0099710 A1 | 5/2005 | Ro | |

FOREIGN PATENT DOCUMENTS

| | | |
|---|---|---|
| DE | 3914334 | 10/1990 |
| DE | 10308067 | 9/2004 |
| WO | WO2006045159 | 5/2006 |

* cited by examiner

*Primary Examiner* — Ha D. Ho
(74) *Attorney, Agent, or Firm* — Reising Ethington P.C.

(57) ABSTRACT

A device to adjust the orientation of a mirror of a motorcar includes a body to accommodate a first and a second electric motor and a first and a second gear driven by first and second motor respectively. Gear rods are formed as circular arc sections and the body accommodates means to resiliently press the first and second gear rod against the first and second gears, respectively, eliminating relative movement between the gearing of the gear rods and the gears in operation conditions. Each of the gears include a safety clutch, allowing the gears to slip in overload conditions.

10 Claims, 10 Drawing Sheets

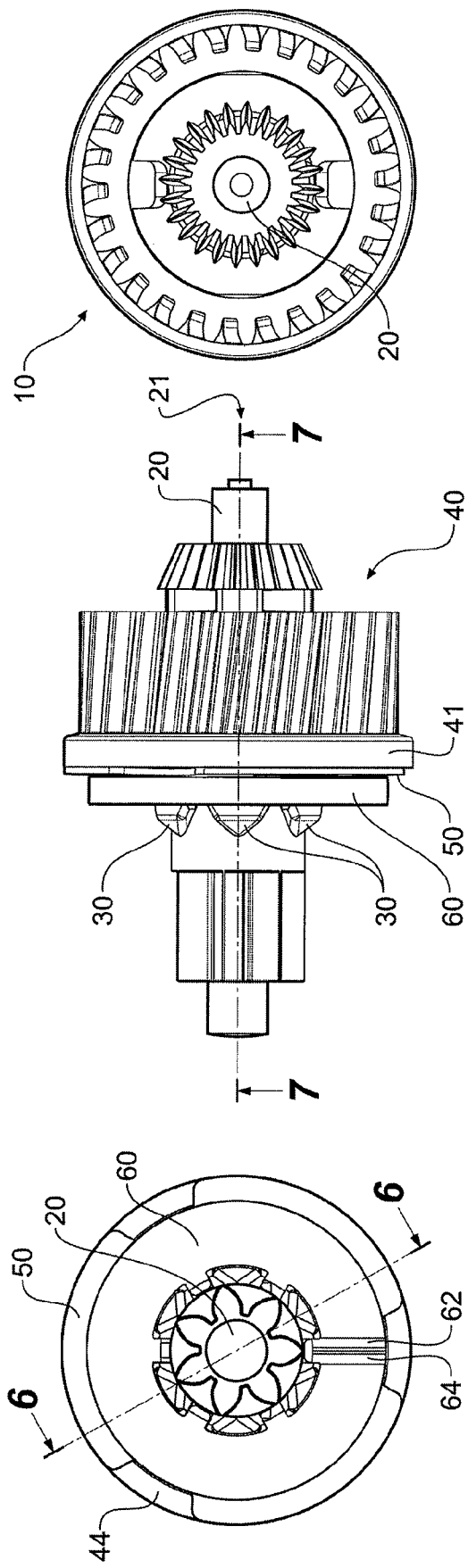

SECTION: C-C

SECTION: B-B

DEVICE TO ADJUST THE ORIENTATION OF A MIRROR OF A MOTORCAR

The invention is based on a priority patent application EP 07014141.1 which is hereby incorporated by reference.

BACKGROUND ART

1. Field of the Invention

The invention relates to a device to adjust the orientation of a mirror of a motorcar according to the Device to adjust the orientation of a mirror of a motorcar, comprising a body accommodating a first and a second electric motor and a first and a second gear driven by said first and second motor respectively, a reflective element support pivot-mounted at the body in relation to two pivot axles, at which reflective element support two gear rods are arranged engaging with said gears, a first gear rod engaging with the first gear to pivot the reflective element support around a first pivot axle and a second gear rod engaging with the second gear to pivot the reflective element support around a second pivot axle, wherein gear rods are formed as circular arc sections each and the body accommodates means to springy press the first and second gear rod against the first and second gear respectively, eliminating relative movement between the gearing of the gear rods and the gears in operation conditions, and the gears comprise safety clutch means each, allowing the gears to slip in overload conditions, characterized in that the safety clutch means comprise a disc spring having a friction face forced against a corresponding friction face on another gear train member.

2. Description of the Related Art

To adjust the orientation particularly of a door mirror of a motorcar, devices are known comprising electric motors whose shafts via motion transmission means are connected with a reflective element support, on which a reflective element, such as a mirror, is arranged.

In order to provide low cost light weight devices, most components, like e.g. body, reflective element support, transmission means such as gears and gear rods and the like, the bearing between the body and the reflective element support, are constructed from polymers including various plastics. With plastics, at least in comparison with metals, it is difficult to achieve required manufacturing tolerances, resulting in slackness and thus little movement or judder of the reflective element support around zero position. This leads to delayed response characteristics when adjusting the orientation of the mirror, since the electric motors in the very beginning of each adjustment procedure first have to break the slackness of the device, particularly of the transmission means. The slackness can also result in judder of the door mirrors at high speeds of a motorcar.

To counteract the judder, it is known to damp the movement of the reflective element support against the body by friction, disadvantageously resulting in abrasion and thus degeneration with increasing operating time.

From EP 0 596 182 A1 a device to adjust the orientation of a mirror of a motorcar is known, which comprises a body accommodating a first and a second electric motor and a first and a second worm drive driven by said first and second motor respectively. The device further comprises a reflective element support pivot-mounted at the body in relation to two perpendicular pivot axles, at which support two gear rods are arranged, each one engaging with said worm drives, a first gear rod engaging with the first worm drive to pivot the reflective element support around a first pivot axle and a second gear rod engaging with the second worm drive to pivot the reflective element support around a second pivot axle. Each gear rod is clipped on the reflective element support by inserting it into a mounting seat and engaging an end hole on a pivot. The latter is radially orientated towards the centre of the reflective element support and comprises a spherical projection on one of its ends retaining the gear rod on the pivot. This arrangement results in that the gear rod can commute in all directions relative to the reflective element support. To maintain the coupling between the commuting gear rods and the worm screws, springs are foreseen within the body. Disadvantageously this arrangement does not reduce slackness and thus judder because of the slackness of the commuting gear rods. A further disadvantage of this device is, that when manually adjusting the mirror, or, during overload conditions e.g. due to internal or external forces, the worm drives avoid back driving the gear and thus the electric motors. Due to this in overload conditions the springs have to allow the gear rods to disengage the worm drives and to skip their gearings. This results in noises and also abrasions of the gearing of the gear rods and worm drives.

From U.S. Pat. No. 5,701,211 a device to adjust the orientation of a mirror of a motorcar is known, which comprises a body accommodating a first and a second electric motor and a first and a second gear train driven by said first and second motor respectively. The device further comprises a reflective element support pivot-mounted at the body in relation to two perpendicular pivot axles, at which support two gear rods are arranged, each one engaging with said gear trains, a first gear rod engaging with the first gear train to pivot the reflective element support around a first pivot axle and a second gear rod engaging with the second gear train to pivot the reflective element support around a second pivot axle. Each gear rod is mounted at the reflective element support by a ball head, allowing it to commute in any direction. In order to guide the gear rods in a duct through which they enter the body, a spring is arranged within said duct.

A disadvantage of all known devices is, that for a given angle of travel they require a relatively large, particularly deep installation space.

SUMMARY OF THE INVENTION

An object of the invention is to develop a device to adjust the orientation of a mirror of a motorcar requiring less installation space for a given angel of travel and having improved response characteristics, reduced abrasions in operation and overload conditions and reduced noises in overload conditions.

DISCLOSURE OF THE INVENTION AND ITS ADVANTAGES

The object of the invention is met by a device to adjust the orientation of a mirror of a motorcar, comprising a body accommodating a first and a second electric motor and a first and a second gear driven by said first and second motor respectively. Said device further comprises a reflective element support pivot-mounted at the body in relation to two pivot axles, at which reflective element support two gear rods are arranged engaging with said gears, a first gear rod engaging with the first gear to pivot the reflective element support around a first pivot axle and a second gear rod engaging with the second gear to pivot the reflective element support around a second pivot axle. In order to reduce installation space requirements at a given angel of travel, the gear rods are formed as circular arc sections each, particularly reducing the depth of the device and allowing it to fit in a small space. The body of the device also accommodates means to springy press the first and second gear rod against the first and second gear respectively, eliminating relative moving between the gearing of the gear rods and the gears in operation conditions, and the gears comprise safety clutch means each, allowing the gears to slip in overload conditions.

The centre of the circular arc of the first gear rod has not to be the second pivot axle. Also each gear rod can be mounted in the support such that it can articulate. The gear teeth on each gear rod preferably are tapered to allow this movement in one direction. Movement in the other direction occurs as the gear rod rolls around the gear. The means to springy press the first and second gear rod against the first and second gear respectively preferably are positioned so that this movement is allowed.

Advantages of the invention over the state of the art are, that the means to springy press the gear rods against the gears improve the response characteristics of the device, since relative moving between the gearing of the gear rods and gears is eliminated. This results in a damping of the gears and gear rods instead of a damping of the reflective element support versus the body according to the state of the art. Compared to the state of the art, this damping is abrasion free and without degeneration over lifetime. Due to the safety clutch means abrasions of the gearing of the gear rods and gears and thus noises caused by overload conditions, like e.g. one or both gear rods and/or the reflective element support reach the end of their adjusting range, the reflective element and thus the reflective element support is exposed to external forces like e.g. manual pivoting during a manual adjustment, during repairs and the like, are eliminated. The safety clutch means thus allow using gears that are non-back drivable, such as gears having at least one worm drive, without hazarding the consequences of abrasions of such gears in overload conditions. In order to provide low cost lightweight gear trains, preferably gears constructed from polymers including various plastics are employed. The curved gear rods reduce installation space requirements of the device at a given angel of travel of the reflective element support. Particularly the curved gear rods reduce the depth of the device and allow it to fit in a small space.

The safety clutch means preferably comprise a disc spring having a friction face forced against a corresponding friction face on another gear train member. Disc springs or bellview washers are compact and low cost.

The safety clutch means preferably comprise a drive shaft, a torque transmission member co-axially mounted to the drive shaft, a clutch member operably connected to or integral with the torque transmission member and having a first friction face. The safety clutch means further comprise a disc spring mounted around the drive shaft and having a second friction face engaging the first friction face, a resilient retainer retaining the disc spring in a compressed condition in which the first and second friction faces are compressed together to allow torque transmission. The retainer includes a fractured ring having first and second ends resulting from the fracture, the ends adjacent and biased towards each other.

The safety clutch means further preferably comprise a third friction face on the gear opposite of the first friction face and a cone on the shaft. Said cone has a fourth friction face against which the retainer via the disc spring presses the third friction face to improve torque transmission between the shaft and the gear. The advantage of this is that it lowers the spring force required to achieve a certain torque. This means that the pressure is lowered and therefore the clutch will wear less.

In a preferred embodiment of said invention, the gear rods are formed as circular arc sections each, wherein the centre of the circular arc section of the first gear rod is the first pivot axle and the centre of the circular arc section of the second gear rod is the second pivot axle, and wherein each gear rod is fixed arranged at the reflective element support at least in relation to the pivot axle around which it pivots the reflective element support and in relation to an axle perpendicular to the two pivot axles.

Thereby each, i.e. the first and the second gear rod preferably is pivot mounted in relation to the pivot axle around which the other, i.e. the second and the first gear rod pivots the reflective element support.

In another preferred embodiment of said invention, the means to springy press the first and second gear rod against the first and second gear respectively comprise one spring per gear rod and gear.

Preferably the spring is a leaf spring.

In an additional preferred embodiment of said invention, the means to springy press the first and second gear rod against the first and second gear respectively comprise a spring jack pressing the first gear rod against the first gear as well as pressing the second gear rod against the second gear.

The spring jack preferably comprises a spring jack support arranged within the body between the gear rods and the electric motors and/or the gears, a first extension with a first free end springy pressing the first gear rod against the first gear and a first fixed end connected with the spring jack support, plus a second extension with a second free end springy pressing the second gear rod against the second gear and a second fixed end connected with the spring jack support.

According to a particularly preferred embodiment of the invention, the pivot axles are arranged perpendicular to each other.

BRIEF DESCRIPTION OF THE DRAWINGS

A specific embodiment of the invention will now be described in some further detail with reference to and as illustrated in the accompanying Figures in which:

FIG. 3 is a front end view of the assembly of FIG. 1.

FIG. 4 is a side view of the assembly of FIG. 1.

FIG. 5 is a rear end view of the assembly of FIG. 1.

FIGS. 10, 11, 12a and 12b show progressive assembly of the assembly of FIG. 1 in a cross-sectional view.

DETAILED DESCRIPTION OF THE PREFERRED EMBODIMENT

Figure 1:
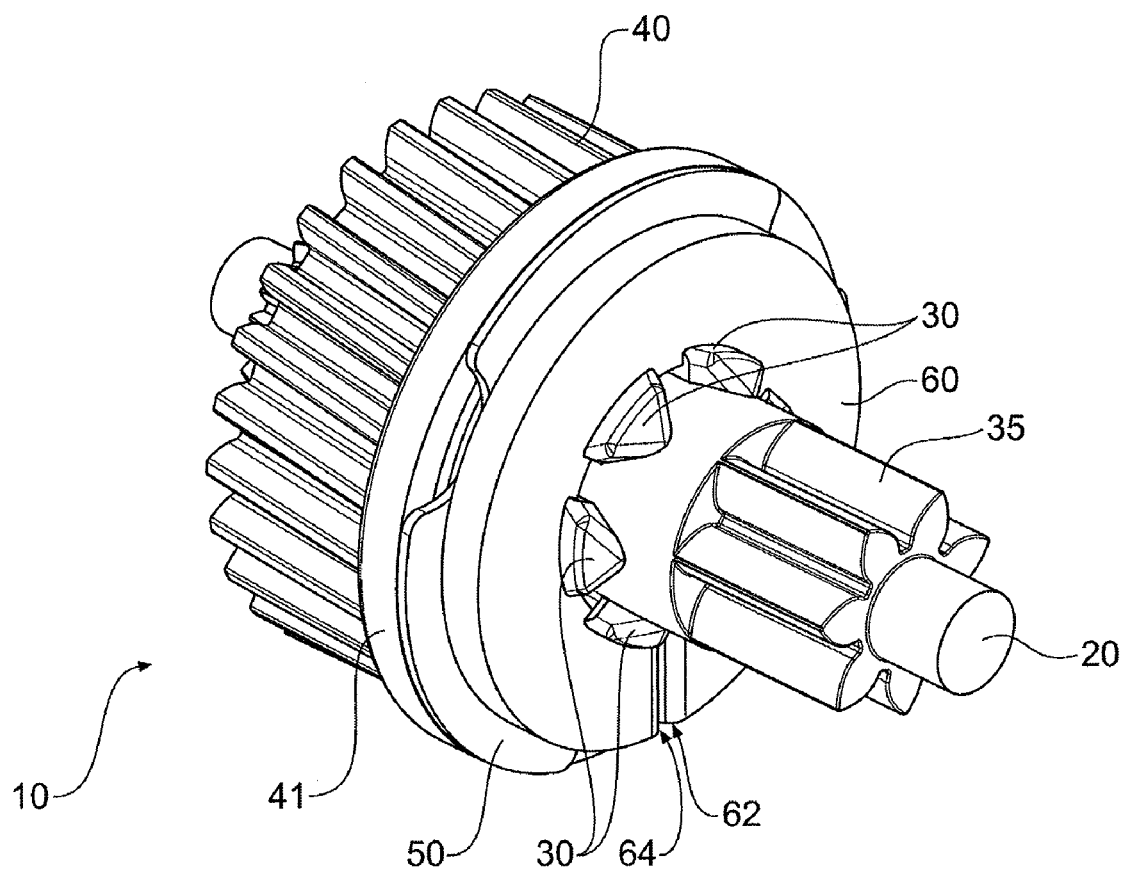
FIG. 1 is an isometric view of a safety clutch means in form of a compact clutch assembly of a device according to the invention according to the invention.

A device 100 to adjust the orientation of a mirror of a motorcar is shown in FIGS. 13, 15, 16 and 17. The device 100 includes a body 110 having an upper half 6 and a lower half 18 accommodating first and second electric motors 7, 8. First and second gear trains 120, 121 are driven by the first and second motor 7, 8, respectively. Each gear train 120, 121 includes a worm drive 15 driven by one of the electric motors 7, 8. The worm drive 15 engages a gear 40 mounted on a drive shaft 20. An output gear 35 is integral part of the drive shaft 20. The device 100 further includes a reflective element support 4 pivot-mounted in a spherical pivot bearing 5 at the body 110 in relation to two pivot axles, arranged perpendicular to each other. At the reflective element support 4 two gear rods 17, 19 are arranged engaging with the gear trains 120, 121, a first gear rod 17 engaging with the first gear train 120 to pivot the reflective element support 4 around a first pivot axle and a second gear rod 19 engaging with the second gear train 121 to pivot the reflective element support 4 around a second pivot axle. In detail, each gear rod 17, 19 engages the output gear 35 of one of the two gear trains 120, 121. The body 110 of the device 100 also accommodates a spring jack 9 to resiliently press the first and second gear rod 17, 19 against the first and second gear train 120, 121, respectively, eliminating relative movement between the gearing of the gear rods 17, 19 and the gear trains 120, 121 in operating conditions. Each of the gear trains 120, 121 includes a safety clutch 10, allowing the gear trains 120, 121 to slip in overload conditions. In detail, the safety clutch 10 allows the gear 40 to slip versus the drive shaft 20. The safety clutch 10 is described in detail thereinafter. The body 110 further accommodates a carrier circuit 16 to electrically connect the electric motors 7, 8. The upper 6 and lower half 18 of the body 110 are held together by a single screw 1 which also fixes the reflective element support 4 in the spherical pivot bearing 5 at the body 110. To ensure tight and also movable mounting, a pivot spring 3 and a pivot ball 2 are foreseen via which the screw 1 holds the reflective element support 4 in the spherical pivot bearing 5 on the body.

The gear rods 17, 19 are formed as circular arc sections each, wherein the center of the circular arc section of the first gear rod 17 is the first pivot axle, and the center of the circular arc section of the second gear rod 19 is the second pivot axle. Each gear rod 17, 19 is fixed arranged at the reflective element support 4 at least in relation to the pivot axle around which it pivots the reflective element support 4 and in relation to an axle perpendicular to the two pivot axles. Thereby each, i.e. the first and the second gear rod 17, 19, preferably is pivot mounted in relation to the pivot axle around which the other, i.e. the second and the first gear rod 19, 17, pivots the reflective element support 4.

The spring jack 9 presses the first gear rod 17 against the output gear 35 of the first gear train 120 and presses the second gear rod 19 against the output gear 35 of the second gear train 121.

Figure 14:
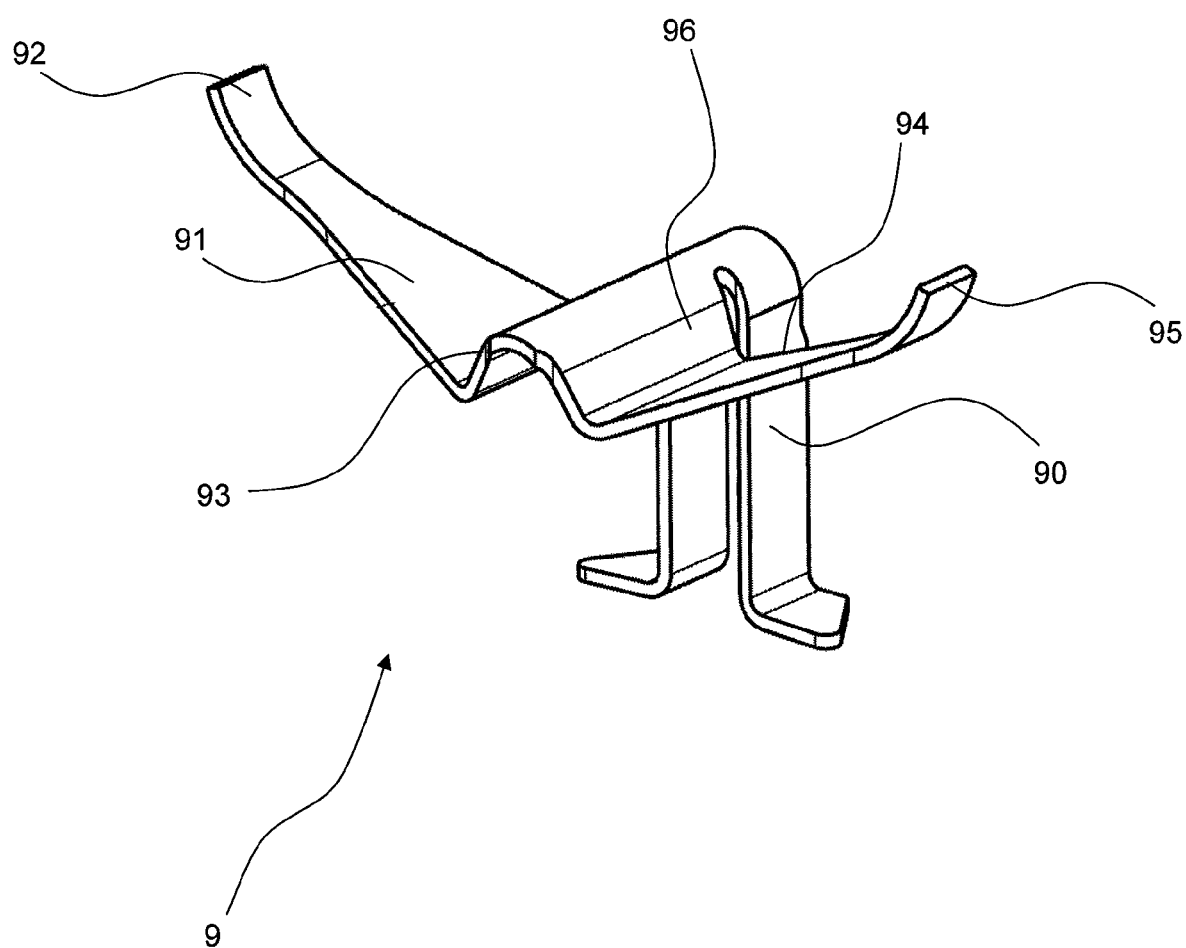
FIG. 14 shows a detail of the device of FIG. 13.
Figure 15:
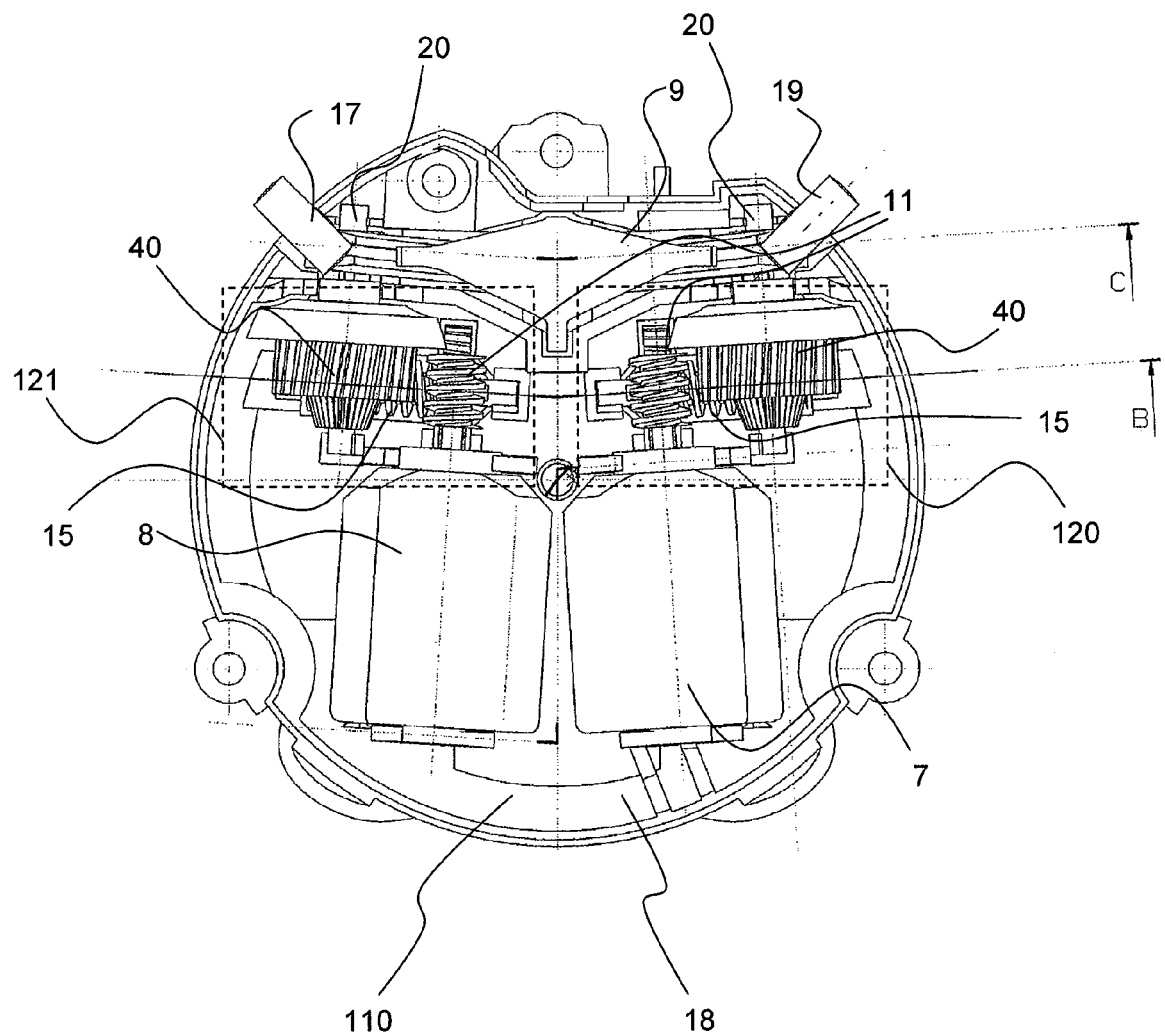
FIG. 15 shows a first cross section of the device of FIG. 13 in assembled condition.
Figure 16:
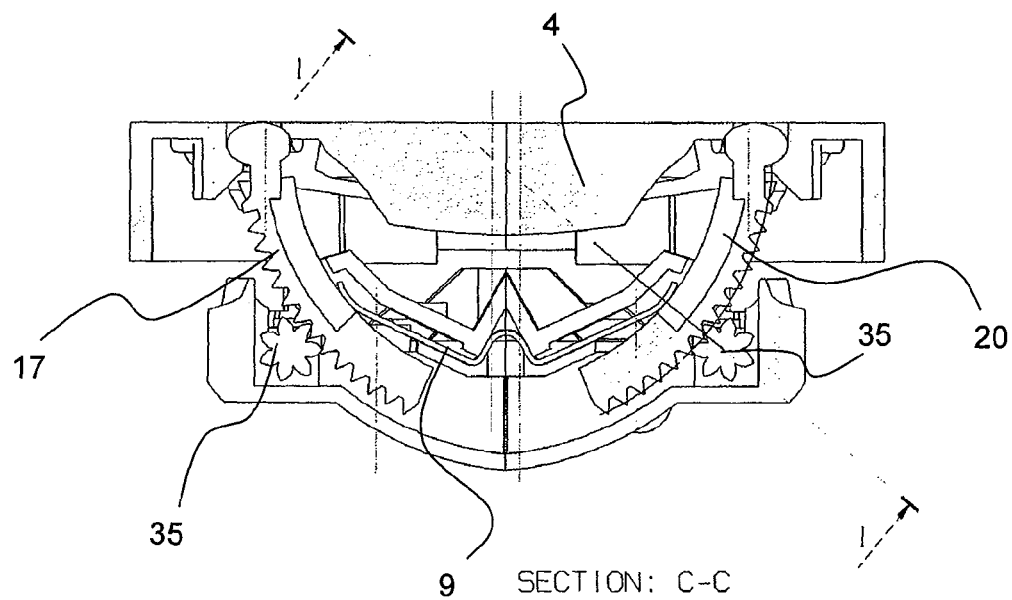
FIG. 16 shows a second cross section of the device of FIG. 13 in assembled condition.
Figure 17:
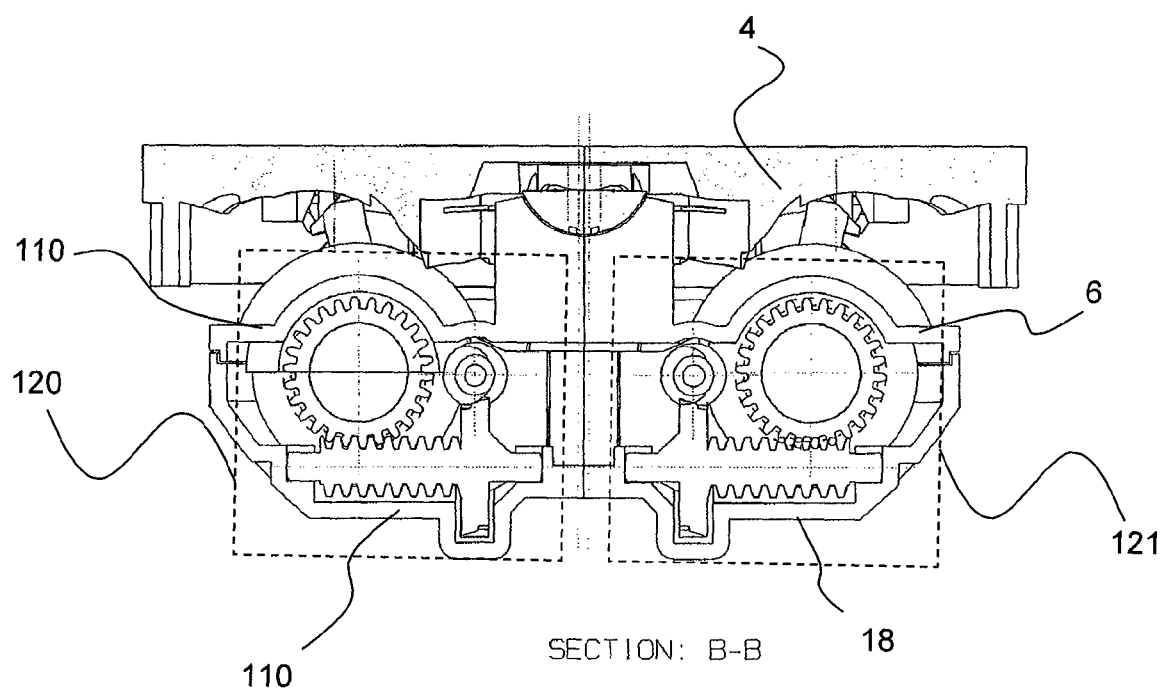
FIG. 17 shows a third cross section of the device of FIG. 13 in assembled condition.

The spring jack 9, shown in detail in FIG. 14, includes a spring jack support 90 arranged within the body 110 between the gear rods 17, 19 and the electric motors 7, 8 and/or the gears 120, 121, a first extension 91 with a first free end 92 forming a resilient shoulder pressing the first gear rod 17 against the output gear 35 of the first gear train 120 and a first fixed end 93 connected with the spring jack support 91. A second extension 94 with a second free end 95 also forms a resilient shoulder that presses the second gear rod 19 against the output gear 35 of the second gear train 121 and a second fixed end 96 connected with the spring jack support 90.

Figure 2:
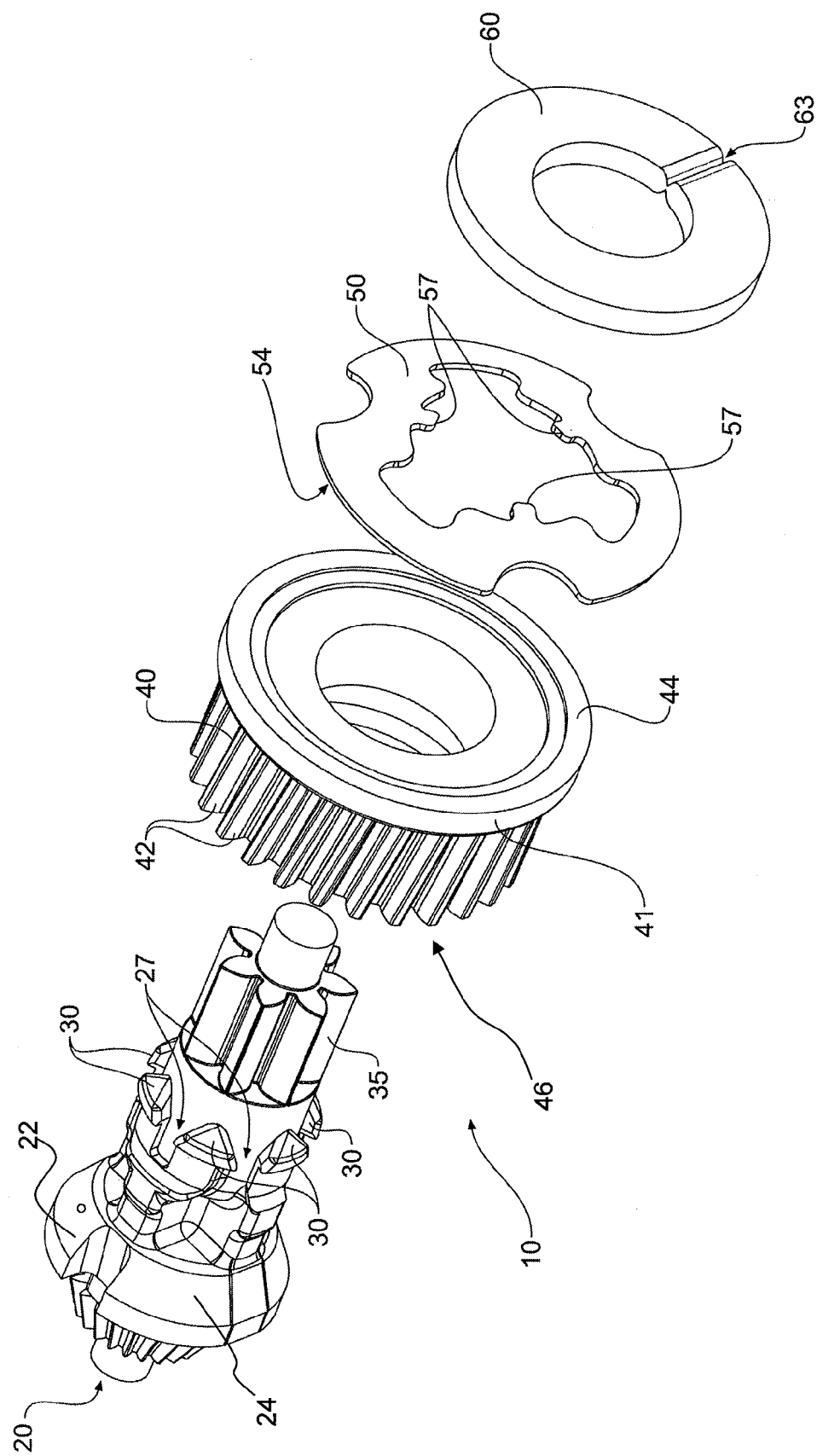
FIG. 2 is an exploded view of the assembly of FIG. 1.
Figure 6:
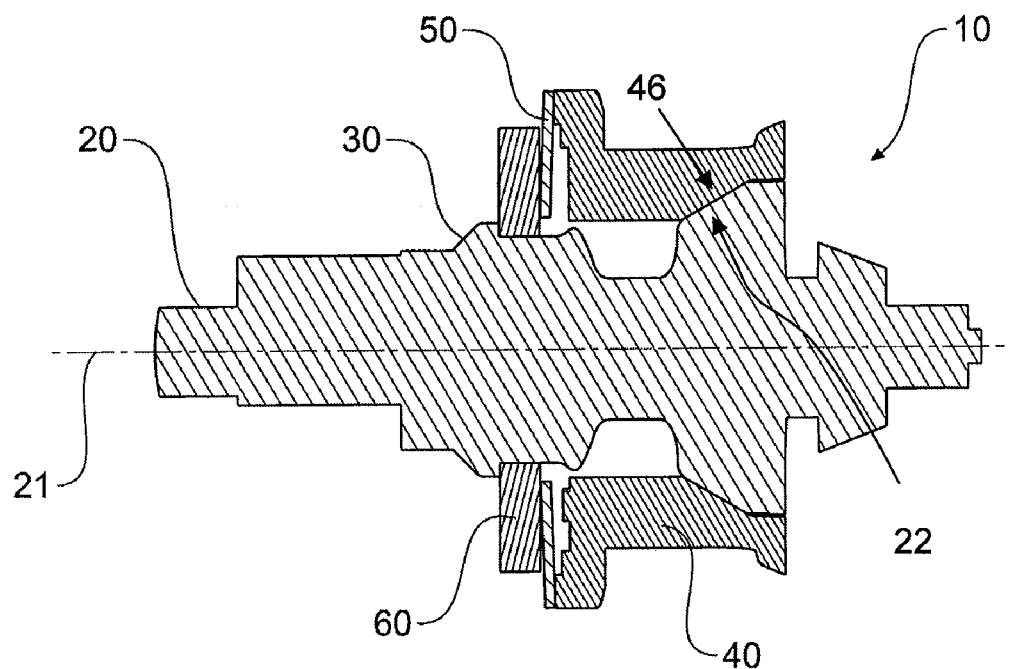
FIG. 6 is a cross sectional view through section lines 6-6 shown on FIG. 3.
Figure 7:
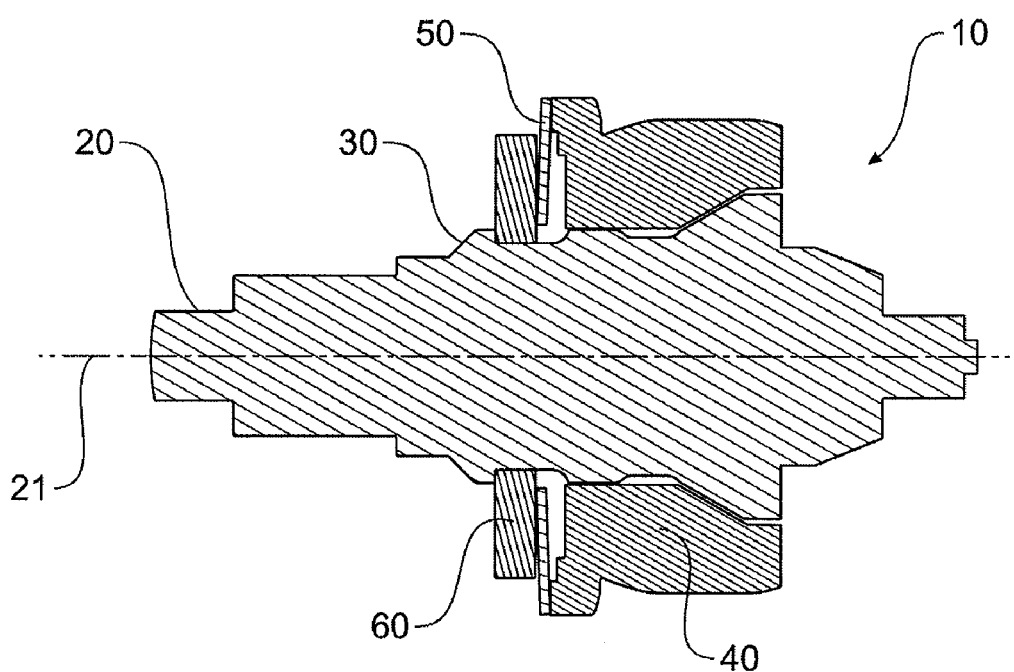
FIG. 7 is a cross sectional view through section line 7-7 shown on FIG. 4.

Referring to FIGS. 1 and 2, the safety clutch 10 is shown in detail. The assembly 10 includes a drive shaft 20, the drive shaft 20 having a plurality of shoulders 30. A torque transmission member in the form of a helical gear 40 is coaxially mounted to the drive shaft 20. A clutch member 41 is integral with the gear 40 and has a first friction face 44. It is also possible that the clutch member 41 may be separate from the torque transmission member 40. A disc spring 50, most clearly shown in FIG. 2, is mounted around the drive shaft 20 and has a second friction face 54 engaging the first friction face 44. A resilient retainer 60 retains the disc spring 50 in a compressed condition in which the first and second friction face 44 and 54 are compressed together to allow torque transmission between the shaft 20 and the gear 40 via a third friction face 46 on the gear 40 opposite of the first friction face 44 and a fourth friction face 22 on a cone 24 on the shaft 20 (FIG. 6). The retainer 60 is characterized in that it includes a fractured ring having first 62 and second 64 ends, the ends resulting from a fracture and the ends being biased towards each other. The ends 62, 64 are biased toward each other by the resilience of the material from which the retainer 60 is constructed.

The retainer 60 can be constructed from various materials. In the embodiment of the invention shown, the retainer 60 is constructed from plastic including a stiffening additive.

Stiffening additives such as carbon and glass fiber may be used. Various plastics including nylon and Polytetrafluoroethylene (PTFE) may be used.

Referring now to FIG. 4, operation of the compact clutch assembly will now be described. A worm drive 15 driven by an electric motor 7 or 8, depending on to which gear train 120, 121 the worm drive 15 belongs, is operably connected to the gear 40 to drive it around the axis 21 of the shaft 20. A double reduction worm gear train comprising the worm drive 15 and a worm drive 11 on the shaft of the electric motor 7 or 8 (FIG. 13 and FIG. 15) is employed between the motor 7 or 8 and gear 40 to achieve the desired gearing.

Figure 13:
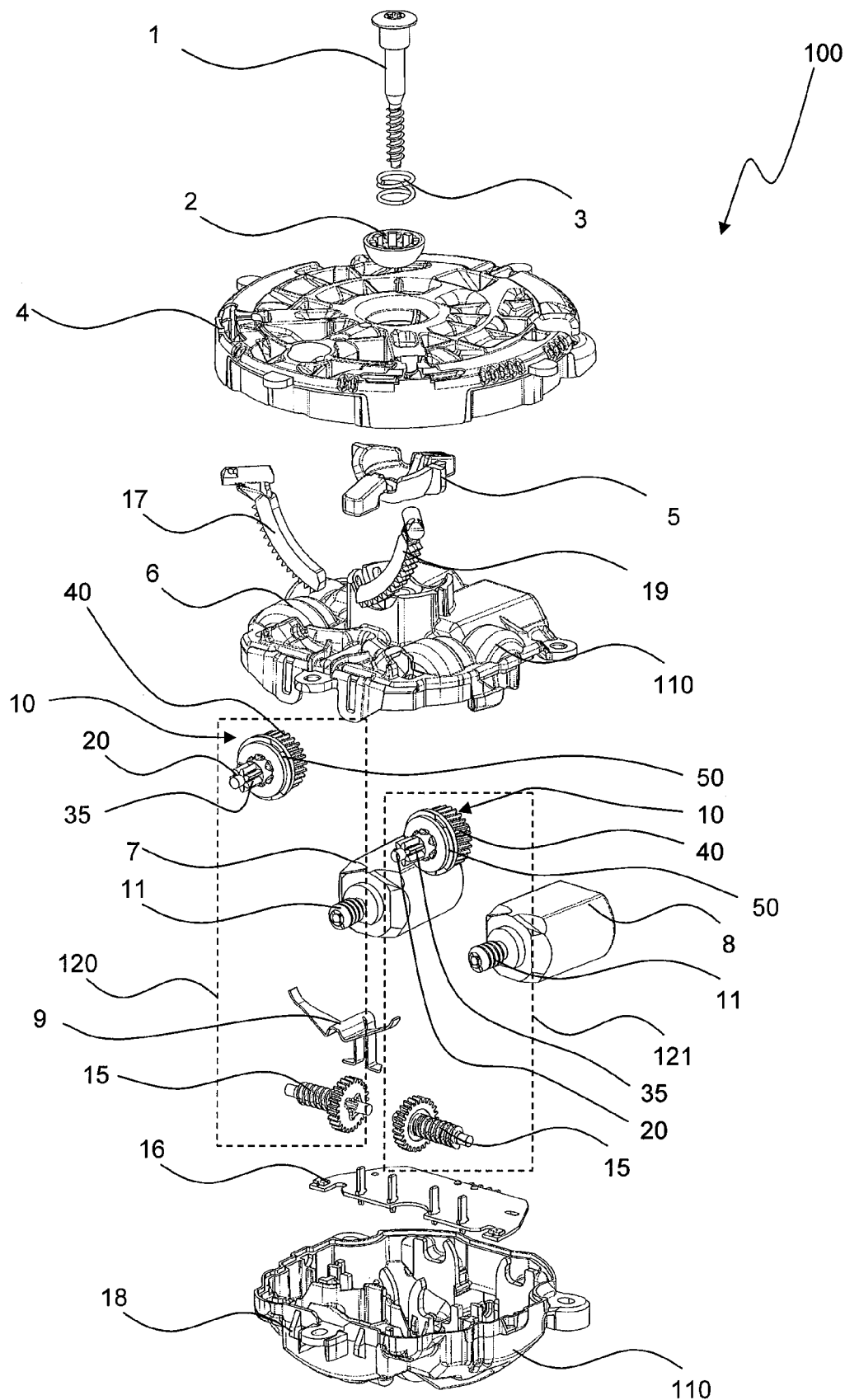
FIG. 13 is an exploded view of a device according to the invention.

In normal operation, the shaft 20 rotates with the gear 40 by virtue of the friction between the first friction face 44 of the clutch area 41 of the gear 40 engaging with the second friction face 54 on the disc spring 50. The disc spring 50 is keyed to the shaft 20 by virtue of tabs 57 that key into corresponding slots 27 on shaft 20 as can most clearly be seen in FIGS. 2 and 3. The output gear 35 is keyed to the disc spring 50 through slots 27. Thus, as the disc spring 50 rotates with the gear 40, the output gear 35 also rotates. The output gear 35 mates with a gear rod 17, 19 that drives a reflective element support 4 (FIG. 13). A reflective element mounted on that support 4 typically is a mirror. When an operator manually moves the mirror thereby causing the gear rod 17, 19 to drive the output gear 35, the disc spring 50 slips against the friction face 44 of the gear and clutch components 40 and 41. This slippage prevents damage of the non-back drivable worm drive 15 meshing with the gear 40.

It is important to mention that the disc spring 50 is correctly compressed between the friction face 44 of the clutch member 41 and the retainer 60 so that an appropriate level torque can be transmitted without slippage. There must be sufficient torque to allow the gear trains 120, 121 to drive the reflective element support 4 against secretions such as dirt and ice. On the other hand, the torque transmission should not be too high otherwise damage may occur to the gear trains 120, 121 when an operator manually attempts to override the mechanism by pressing on the surface of e.g. the mirror glass. The retainer 60 of the invention is important in achieving the goal of appropriate torque transmission that is torque transmission within a specified tolerance.

Figure 10:
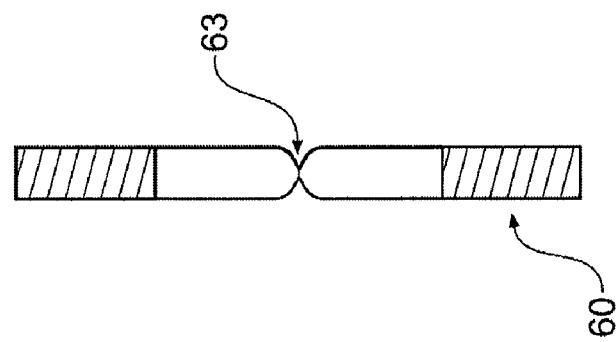
FIG. 10 is a cross sectional view through section line 10-10 shown on FIG. 9.
Figure 9:
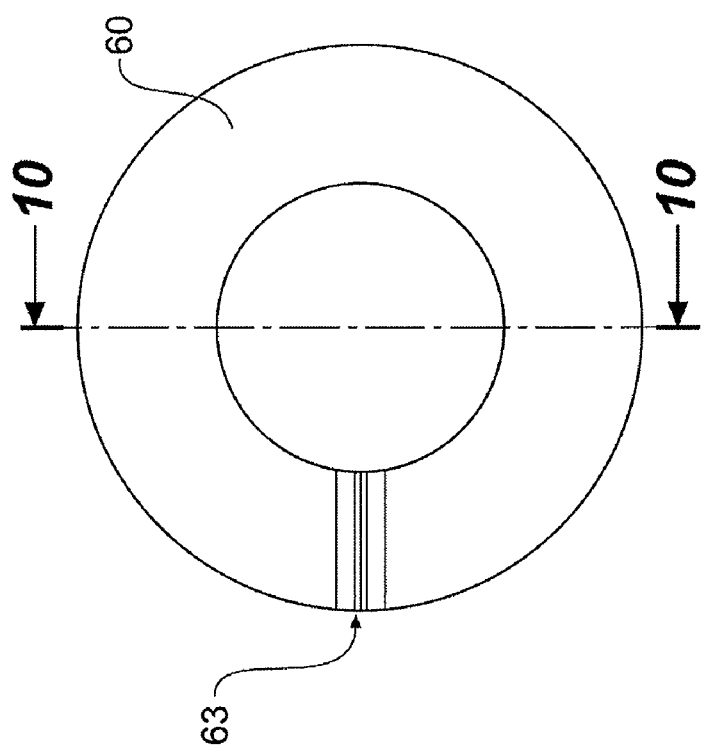
FIG. 9 is an end view of the retainment of FIG. 8.
Figure 8:
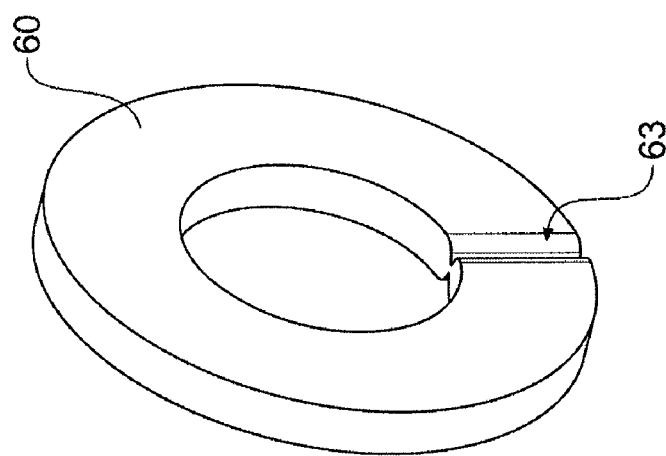
FIG. 8 is an isometric view of a retaining ring component of the assembly of FIG. 1.
Figure 11:
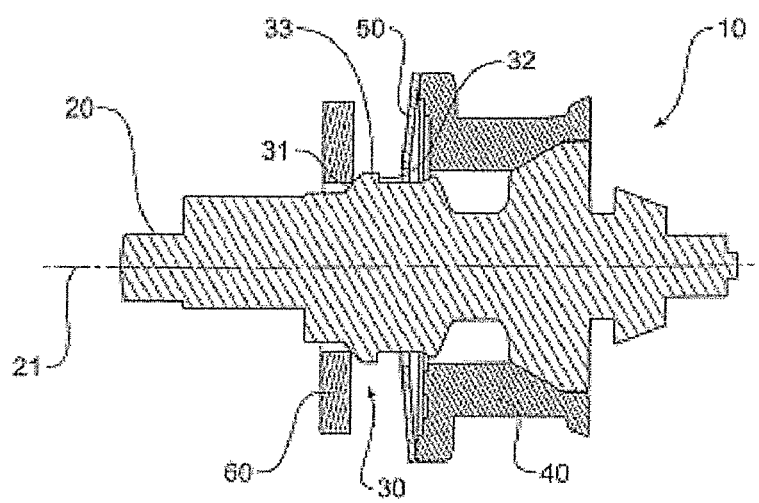

Referring now to FIGS. 8, 9 and 10, the retainer 60 is shown in more detail. The retainer 60 includes a necked region 63 that will preferentially fracture when sufficient hoop stress is applied.

A method of assembling the compact clutch assembly will now be described with reference to FIGS. 2, 11, 12a and 12b. A clutch member 41 mounted around a drive shaft 20 is provided. The clutch member has a first friction face 44. A disc spring 50 is mounted around the shaft so that a second friction face 54 is engagable with the first friction face 44. An annular retainer 60 is then forced in an axial direction against the ramped faces 31 of the shoulders 30 and the spring 50 so as to create sufficient hoop stress to create a fracture through the retainer 50, at necked region 63. The fracture allows the retainer 50 to expand and pass over the shoulders 30. This is shown progressively in FIGS. 11, 12a and 12b.

The necked area 63 of the retainer 60 is designed such that it acts as a complete hoop during assembly to enable the retainer 60 to centralize itself on the ramped faces 31 of the shoulders 30. Once the retainer 60 has centralized itself with respect to the ramped surfaces 31 and the drive shaft axis 21, the assembly force progressively increases and the retainer splits at the necked area 63.

After fracturing and passing over the shoulders 30, the newly formed ends 62 and 64 (shown in FIG. 1) snap towards each other due to the resilience of the retainer 60. The fractured retainer 60 is then seated between the undercut faces 32 of the shoulders 30 and the disc spring 50 to thereby retain the spring 50 as is shown in FIG. 1.

Figure 12:
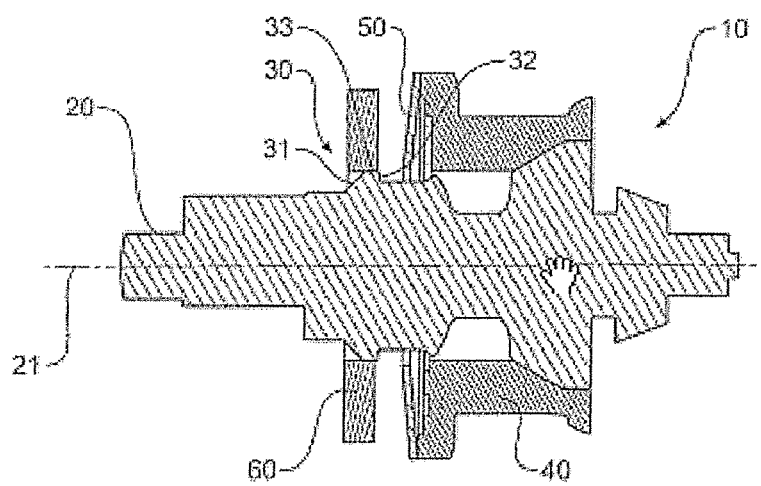
Figure 12:
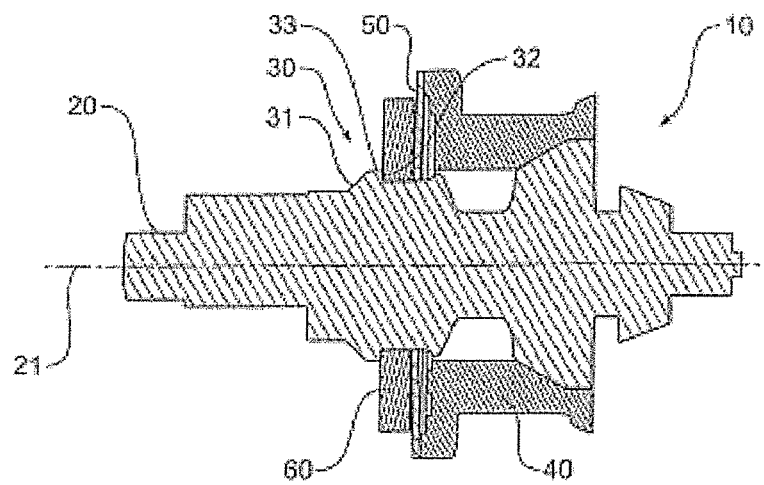

Referring to FIG. 12a, the retainer 60 is shown in its fractured state passing over the outer faces 33 of the shoulders 30. Because the retainer 60 is now fractured, the compressive force it exerts on the outer faces 33 of the shoulders 30 is relatively small. This ensures that damage to the shoulders 30 is minimized and that the exact position of the retainer 60 when it reaches the position under the undercut face 32 is predictable and controllable. This in turn means that the degree of compression of the spring 50 between the retainer 60 and the gear 40 is predictable and controllable.

The afore-mentioned centralizing of the retainer 60 and subsequent splitting of the retainer 60 eliminates or at least reduces damage to the ramped faces 31, the outer faces 33 and the under cut faces 32 of the shoulders 30. The effect of this is to more predictably and controllably compress the spring 50 between the retainer 60 and the gear 40. In turn, this means that the clutch force can be more accurately set therefore enabling mass production of the clutch assembly 10 while meeting exacting torque transmission and clutching characteristics.

While the present invention has been described in terms of preferred embodiments in order to facilitate better understanding of the invention, it should be appreciated that the various modifications can be made without departing from the principles of the invention. Therefore, the invention should be understood to include all such modifications within its scope.

The invention claimed is:

1. A device to adjust the orientation of a mirror of a motorcar, said device comprising: a body accommodating a first and a second electric motor and a first and a second gear driven by said first and second motor respectively; a reflective element support pivot-mounted at the body in relation to two pivot axles, at which reflective element support two gear rods are arranged engaging with said gears, wherein said first gear rod engages said first gear to pivot the reflective element support around a first pivot axle and said second gear rod engages said second gear to pivot the reflective element support around a second pivot axle, wherein said gear rods are formed as circular arc sections each and said body accommodates a resilient press to press said first and second gear rods against said first and second gears, respectively, eliminating relative movement between the gearing of said gear rods and said gears in operation conditions; and each of said gears includes a safety clutch, allowing said gears to slip in overload conditions, characterized in that said safety clutch includes a disc spring having a friction face forced against a corresponding friction face on said gear.

2. A device according to claim 1, characterized in that the safety clutch comprise a drive shaft, a torque transmission member co-axially mounted to the drive shaft, a clutch member operably connected to or integral with the torque transmission member, the clutch member having a first friction face, said disc spring mounted around the drive shaft and having a second friction face engaging the first friction face, a resilient retainer retaining the disc spring in a compressed condition in which the first and second friction faces are compressed together to allow torque transmission, wherein the retainer includes a fractured ring having first and second ends resulting from the fracture, the ends adjacent and biased towards each other.

3. A device according to claim 2, characterized in that the safety clutch further comprise a third friction face on the first gear opposite of the first friction face and a cone on the shaft, said cone having a fourth friction face against which the retainer via the disc spring presses the third friction face to improve torque transmission between the shaft and the first gear.

4. A device according to claim 3, characterized in that the center of said circular arc section of said first gear rod is said first pivot axle and the center of said circular arc section of said second gear rod is said second pivot axle, and wherein each of said first and second gear rods is fixed arranged at the reflective element support at least in relation to the pivot axle around which it pivots said reflective element support and in relation to an axle perpendicular to said two pivot axles.

5. A device according to claim 4, characterized in that each of said gear rods is pivot mounted in relation to said pivot axle around which said other gear rod pivots said reflective element support.

6. A device according to claim 5, characterized in that said resilient press that presses said first and second gear rods against said first and second gears respectively comprise one spring per gear rod and gear.

7. A device according to claim 6, characterized in that said spring is a leaf spring.

8. A device according to claim 1, characterized in that said resilient press comprises a spring jack pressing said first gear rod against said first gear and pressing said second gear rod against said second gear.

9. A device according to claim 8, characterized in that said spring jack comprises a spring jack support arranged within the body between said gear rods and said electric motors and/or said gears, a first extension with a first free end resiliently pressing said first gear rod against said first gear and a first fixed end connected with said spring jack support, plus a second extension with a second free end resiliently pressing said second gear rod against said second gear and a second fixed end connected with said spring jack support.

10. A device according to claim 1, characterized in that the pivot axles are arranged perpendicular to each other.

* * * * *